United States Patent
Kim

(10) Patent No.: US 7,304,690 B2
(45) Date of Patent: Dec. 4, 2007

(54) OPTICAL ENGINE OF A PROJECTION TELEVISION

(75) Inventor: Kwan-heung Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 666 days.

(21) Appl. No.: 10/674,457

(22) Filed: Oct. 1, 2003

(65) Prior Publication Data

US 2004/0070695 A1    Apr. 15, 2004

(30) Foreign Application Priority Data

Oct. 14, 2002    (KR) ............... 10-2002-0062511

(51) Int. Cl.
*H04N 5/74*    (2006.01)
(52) U.S. Cl. .............. 348/782; 348/785; 348/744; 348/745; 348/787; 359/862
(58) Field of Classification Search ........... 348/782, 348/785, 771, 745, 781, 836, 787, 744, 789; 359/822, 831, 838, 850, 862, 865; 353/37, 353/34, 47, 50, 101, 74
See application file for complete search history.

(56) References Cited

U.S. PATENT DOCUMENTS

| | | | | |
|---|---|---|---|---|
| 5,917,558 A * | 6/1999 | Stanton | ............... | 348/743 |
| 6,247,817 B1 * | 6/2001 | Ogawa et al. | ............ | 353/38 |
| 6,753,829 B2 * | 6/2004 | Ouchi | .............. | 345/32 |
| 6,862,047 B2 * | 3/2005 | Hibi | ............... | 348/743 |
| 7,002,533 B2 * | 2/2006 | Sayag | .............. | 345/7 |
| 7,012,654 B2 * | 3/2006 | Choi | ............... | 348/745 |
| 2003/0231261 A1 * | 12/2003 | Bassi et al. | ............ | 348/745 |

* cited by examiner

*Primary Examiner*—David Ometz
*Assistant Examiner*—Jean W. Désir
(74) *Attorney, Agent, or Firm*—Sughrue Mion Pllc.

(57) ABSTRACT

The present invention relates to an optical engine of a projection television in which a path of illumination emitted from a light source is aligned to correspond with the image producer by turning a screw of a mirror device. The object of the present invention can be achieved by an optical engine of a projection television including a light generator, a mirror device for reflecting illumination emitted from the light generator thereby changing a path of the illumination, in which a reflection angle of the illumination can be adjusted, and a projection apparatus for enlarging and projecting the image produced in the image producer on the screen by reflecting the image to an incident illumination from the mirror device, wherein the path of the illumination is aligned to correspond to the whole image produced in the image producer to be projected on the screen by adjusting the mirror device.

7 Claims, 5 Drawing Sheets

OPTICAL ENGINE OF A PROJECTION TELEVISION

BACKGROUND OF THE INVENTION

1. Field of the Invention

The present invention relates to a projection television, and more particularly, to an optical engine of a projection television which projects an image enlarged by a predetermined magnification and lighting onto a projection television screen. The present application is based on Korean Patent Application No. 2002-62511, which is incorporated herein by reference.

2. Description of the Prior Art

Generally, a projection television is an apparatus for enlarging an image produced in an image producer by a predetermined magnification using a lens and a reflector, and projecting the enlarged image onto a screen in order to have an image sized more than 40 inches. An apparatus used for projecting the image in a projection television is an optical engine and projection televisions can be divided into Cathode Ray Tube (CRT) projection, Liquid-Crystal Display (LCD) projection and Digital Micromirror Device (DMD) projection categorized by the types of the image producer.

The optical engine of a projection television comprises mainly an image producer, a light generator, and a projection apparatus.

The image producer producing a predetermined image uses CRT projection, LCD projection, and DMD projection as described above. CRT projection is used only in high end products since it is capable of reproducing a clear image but large in size, and generally, LCD projection is used. However, recently DMD projection using the DMD, which uses lighting more effectively than the LCD has been developed and distributed.

The light generator is a device for emitting light (hereinafter called illumination) from a light source, such as a lamp, to the image producer and is disposed at one side of the image producer.

The projection apparatus is for enlarging the image produced in the image producer and illumination emitted from the light generator and projecting them onto the screen and disposed in front of the image producer.

Accordingly, as described above for the illumination from the light generator, paths of light in the projection television should illuminate the whole image produced in the image producer. If the illumination from the light generator does not correspond with the image producer, the image projected on the screen 10 has a shadow 13 as shown in FIG. 1.

If a shadow 13 is made on the screen 10, there is a need for adjusting the angle of the mirror in the light generator so that the illumination from the light generator corresponds with the image producer.

In order to adjust the mirror of a conventional light generator, either a mirror holder or height of a supporting portion for supporting the mirror holder needs be adjusted. For adjusting the mirror holder or the height of the supporting portion, the metal mold of the mirror holder or the supporting portion needs to be changed. In addition, although the metal mold of the mirror holder or the supporting portion is changed, some products may have shadows due to tolerance in the mounting of each part forming the optical engine, and in that case the angle of the mirror should be changed individually. Thus, it is too costly to change the reflection angle of the mirror to adjust the path of the illumination from the light generator so that the path of the illumination corresponds with the image producer in manufacturing a projection television.

Furthermore, the screen of the projection television with the mirror adjusted may still have a shadow as the path of the illumination from the light source is deviated by the mirror being moved due to a shock during use. In such a case, the path of the illumination needs to be adjusted by controlling the reflection angle of the mirror by readjusting the mirror holder or the supporting portion, and therefore it is extremely difficult to adjust the illumination path.

Accordingly, there is a need for providing a mirror which can have the reflection angle easily adjusted during manufacturing or use.

SUMMARY OF THE INVENTION

An object of the invention is to solve at least the above problems and/or disadvantages and to provide at least the advantages described hereinafter.

Accordingly, one object of the present invention is to solve the foregoing problems by providing an optical engine of a projection television which can have a path of illumination adjusted by simply using a screw without adjusting the height of a mirror holder or a supporting portion to adjust the path of the illumination to correspond with an image producer.

The foregoing and other objects and advantages are realized by providing an optical engine of a projection television for enlarging an image produced in an image producer and projecting the enlarged image on a screen, the optical engine comprising: a light generator; a mirror device for reflecting illumination emitted from the light generator, thereby changing a path of the illumination, wherein in the mirror device a reflection angle of the illumination can be adjusted; and a projection apparatus for enlarging and projecting the image produced in the image producer on the screen by reflecting the image to an incident illumination from the mirror device, wherein the path of the illumination is aligned to correspond to the whole image produced in the image producer to be projected on the screen by adjusting the mirror device.

The mirror device comprises a case having a shape of a box fastened to the projection apparatus, screw portions formed at three corners of a quadrangle defining an upper portion of the case, a mirror unit with a mirror fastened therein for reflecting the illumination emitted from the light generator, the mirror unit comprising holes corresponding to the screw portions, three compression springs disposed between the screw portions of the case and the holes of the mirror unit respectively, and three screws assembled in the screw portions of the case through the holes and the compression springs of the mirroring unit, wherein a reflection angle of the mirror is adjusted by turning the three screws. The mirror unit comprises a mirror, a mirror holder receiving the mirror and having the holes at three corners corresponding to the screw portions of the case, and a mirror fastening bracket for fastening the mirror to the mirror holder.

It is preferable that the image producer is a Digital Micromirror Device (DMD).

In addition, the object of the present invention can be achieved by an optical engine of a projection television for enlarging an image and projecting the enlarged image on a screen, the optical engine comprising a Digital Micromirror Device (DMD) for projecting an image, a light source disposed at one side of the DMD, a lens system for condensing illumination emitted from the light source, a first mirror for changing a path of illumination from the lens system, a lens for condensing illumination from the first mirror, a mirror device with a reflection angle adjusted by turning a screw, for reflecting illumination passing through the lens onto the DMD, a prism disposed on a front surface of the DMD for causing illumination from the mirror device to be reflected onto the DMD, and a projection system for enlarging an image and illumination from the prism and projecting the enlarged image and illumination onto the screen.

It is preferable that the optical engine according to the present invention further comprises a color filter disposed between the light source and the lens system.

According to the optical engine of a projection television according to the present invention described above, shadows can be simply removed from the screen because the path of the illumination emitted from the light source can be adjusted easily by turning the screw of the mirror device.

BRIEF DESCRIPTION OF THE DRAWINGS

The above object and features of the present invention will be more apparent by describing a preferred embodiment of the present invention with reference to the accompanying drawings, in which.

DETAILED DESCRIPTION OF THE PREFERRED EMBODIMENT

Hereinafter, an optical engine of a projection television according to a preferred embodiment of the present invention will be described in greater detail with reference to the accompanying drawings.

Figure 2:
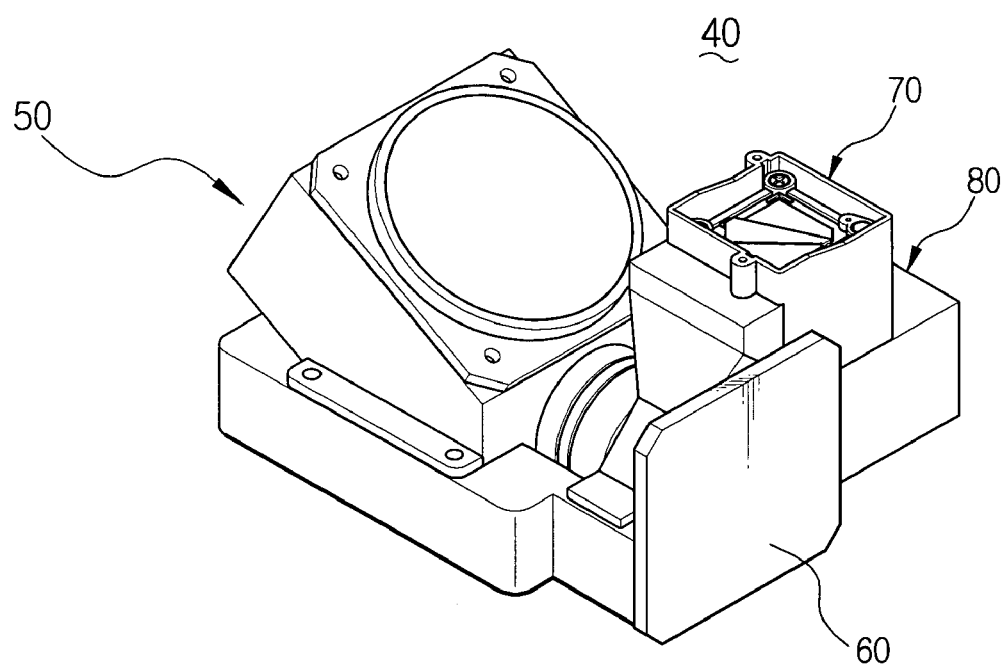
FIG. 2 is a perspective showing an optical engine of a projection television according to the present invention.
Figure 3:
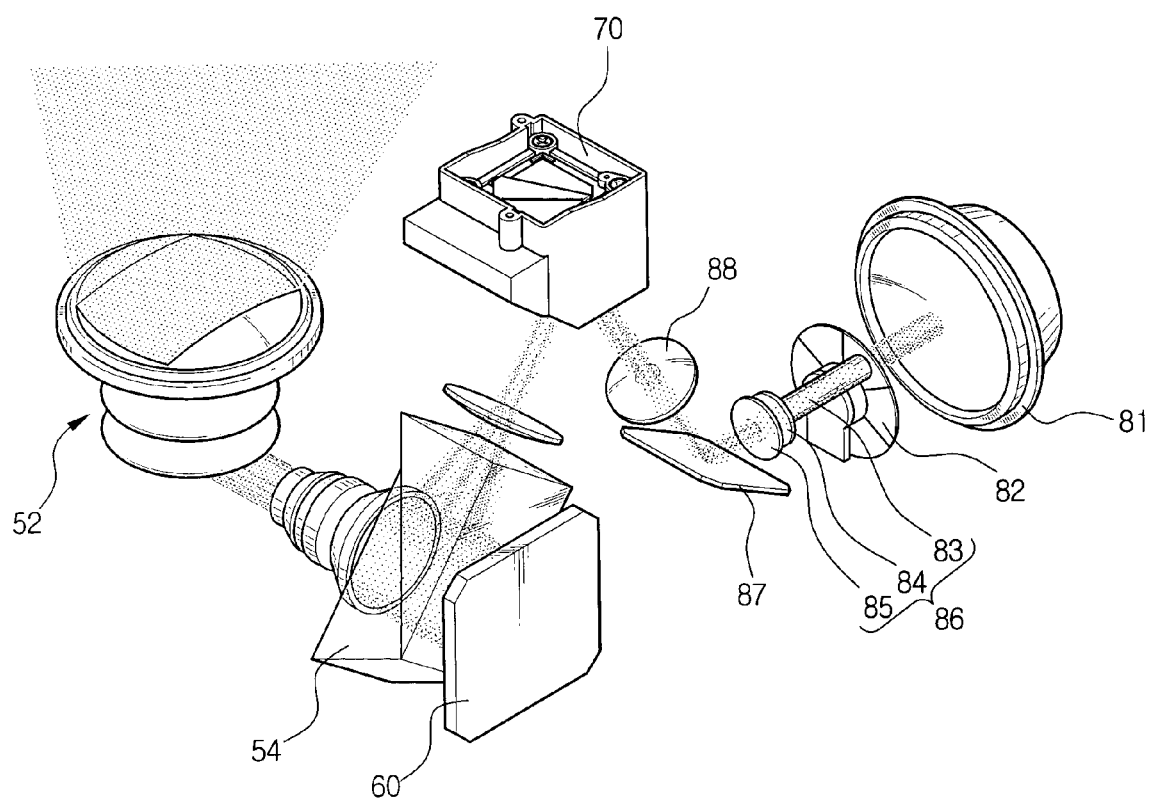
FIG. 3 is a view illustrating the structure of the optical engine of FIG. 2.

Referring to FIGS. 2 and 3, the optical engine 40 of a projection television according to the present invention comprises an image producer 60, a light generator 80, a mirror device 70, and a projection apparatus 50.

The image producer 60 is for producing a predetermined image to project on a screen 10 (FIG. 6) and, in some cases, uses an LCD, but it is preferable to use a DMD.

The light generator 80 is for condensing illumination from a light source 81 and sending the condensed illumination to the mirror device 70 and comprises the light source 81, a lens system 86, a first mirror 87, and a lens 88. The light source 81 is for generating light, i.e., illumination, and uses a halogen lamp or an Ultra High Performance (UHP) lamp. The lens system 86 is disposed in front of the light source 81 and comprises a light tunnel 83, a first lens 84, and a second lens 85. In case colors are represented using a single optical engine, a color filter 82 is disposed in between the light source 81 and the lens system 86.

Figure 4:
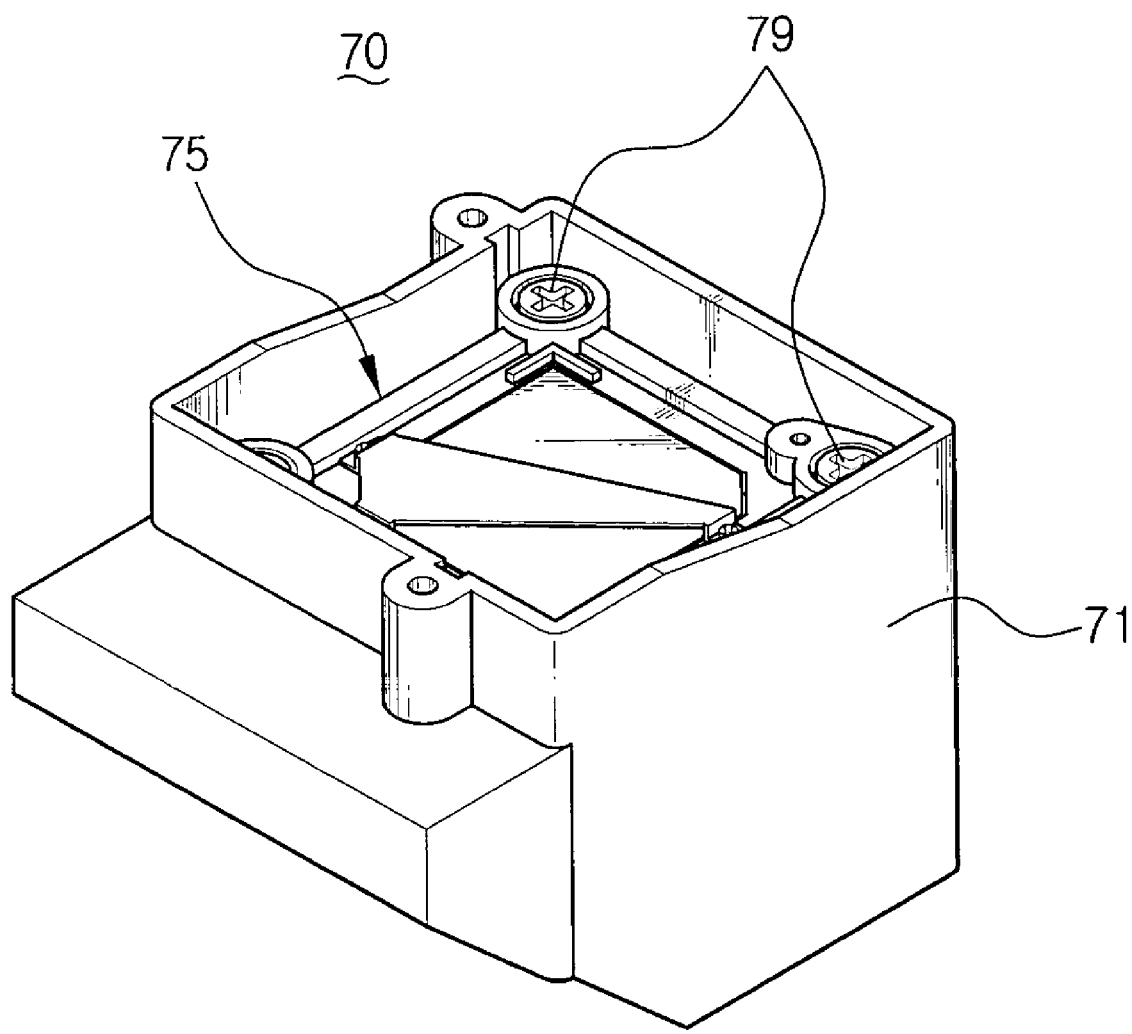
FIG. 4 is a perspective showing a mirror device of the optical engine of FIG. 2.
Figure 5:
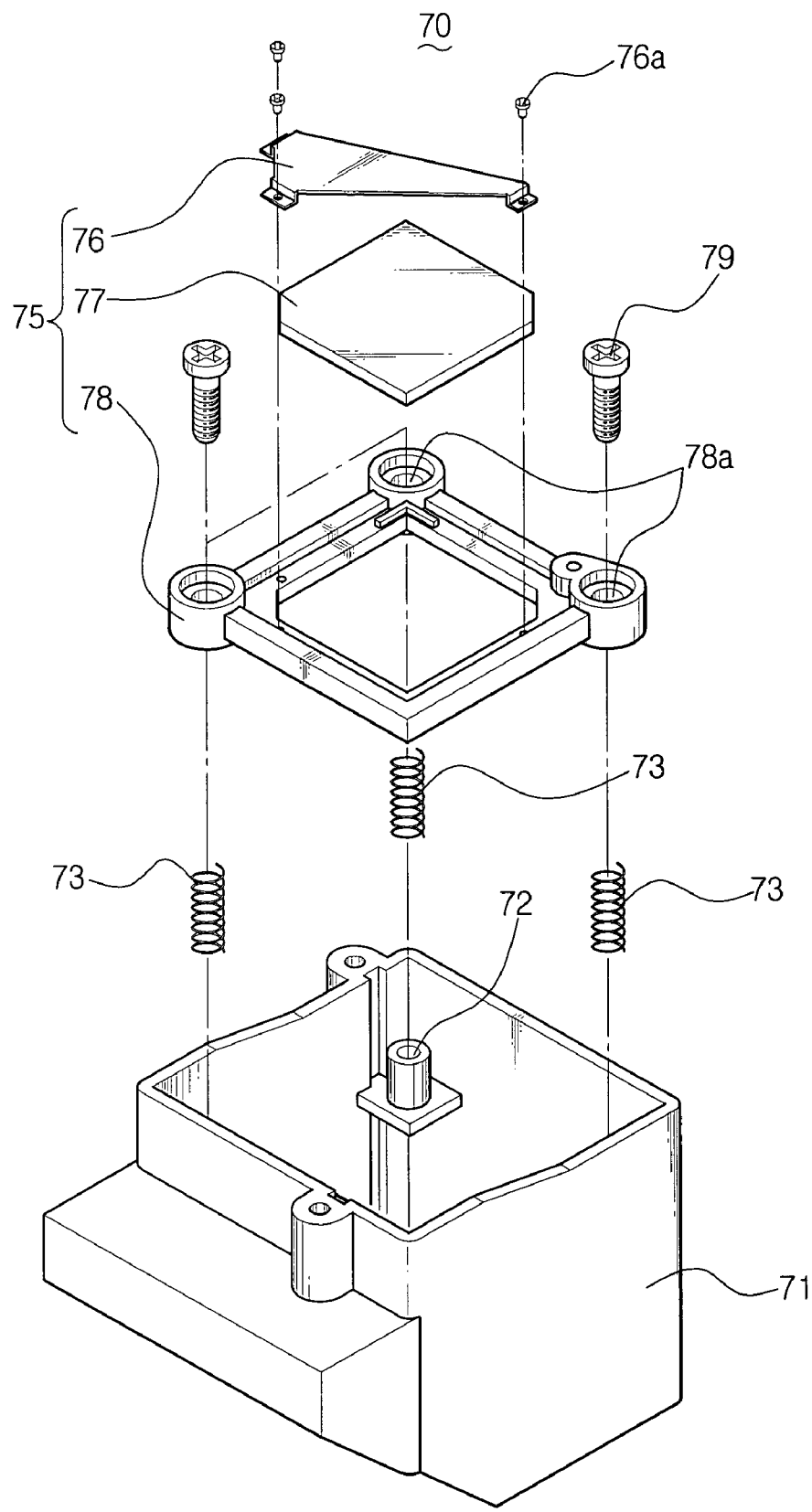
FIG. 5 is an exploded perspective showing the structure of the mirror device.

The mirror device 70 is for adjusting the angle of a mirror, thereby adjusting the illumination from the light generator 80 to correspond to the image producer 60. Referring to FIGS. 4 and 5, the mirror device 70 comprises a case 71, a mirror unit 75, compression springs 73, and screws 79.

The case 71 is disposed between the projection apparatus 50 and the light generator 80, supports a mirror 77, and forms a path for the illumination from the light source 80. The case 71 has a shape of a box and three screw portions 72 formed at three among the four corners of a quadrangle corresponding to the upper portion of the case 71. The three screw portions 72 in the present embodiment are formed at corners of the quadrangle but they may be formed anywhere as long as they can support three points of the mirror unit 75.

The mirror unit 75 having the mirror 77 is assembled into the screw portion 72 of the case 71. The mirror unit 75 comprises a mirror 77, a mirror holder 78 for receiving the mirror 77, and a mirror fastening bracket 76 for fastening the mirror 77 onto the mirror holder 78. The mirror holder 78 has three holes 78a formed at three corners corresponding to the screw portions 72 of the case 71. The mirror fastening bracket 76 is fastened onto the mirror holder 78 using small screws 76a.

The assembling process of the mirror device 70 structured above will be illustrated hereinafter. First of all, the mirror 77 is placed in the mirror holder 78 and fastened by the mirror fastening bracket 76 thereby forming the mirror unit 75. The mirror fastening bracket 76 and the mirror holder 78 are fastened by small screws 76a. The compression springs 73 are then placed respectively in the three screw portions 72 and the mirror unit 75 is placed thereon. After that, the screws 79 are placed to penetrate the holes 78a of the mirror unit 75 and the compression springs 73 and then screwed into the screw portions 72. An example of the assembled mirror device 70 is shown in FIG. 4.

Figure 6:
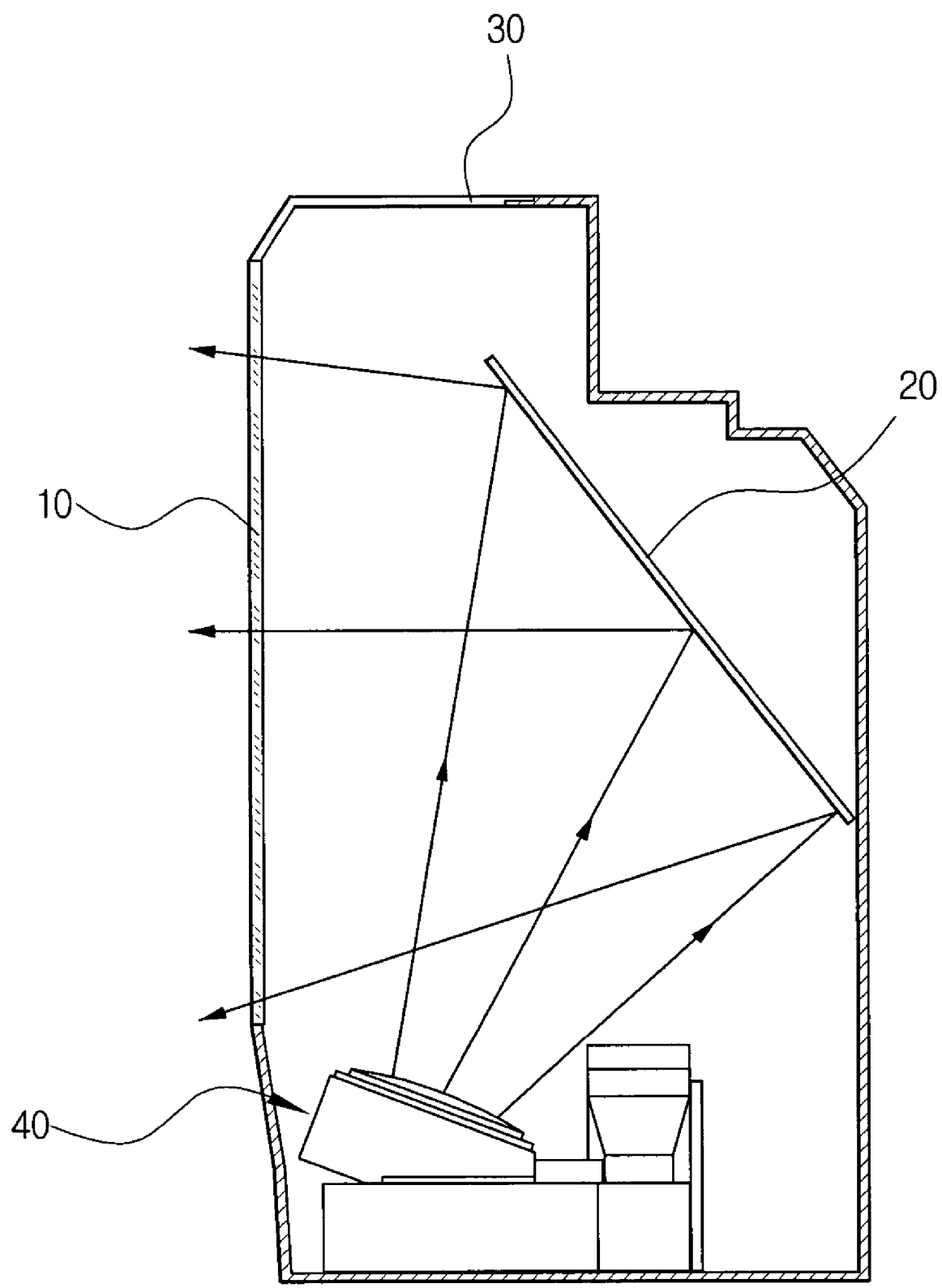
FIG. 6 is a sectional view showing the projection television having the optical engine of FIG. 2.

The projection apparatus 50 is disposed on the front surface of the image producer 60 for enlarging the image produced in the image producer 60 and the illumination emitted from the light generator 80, and projecting the enlarged image and illumination onto the screen 10 (FIG. 6). The projection apparatus 50 comprises a prism 54 for reflecting the incident illumination from the light generator 80 through the mirror device 70 to the image producer 60 to enter again into a projection system 52, and the projection system 52 for enlarging the image and illumination from the prism 54 by a predetermined magnification.

An example of a projection television having the optical engine 40 according to the present invention as described above is shown in FIG. 6. Referring to FIG. 6, the projection television comprises the screen 10, a second mirror 20, a body 30, and the optical engine 40.

The screen 10 is a large screen on which the image and the illumination from the optical engine 40 are projected. The second mirror 20 is for projecting the image and illumination from the optical engine 40 and disposed in various manners depending on the shape and size of the projection television. The body 0.30 supports and fastens the screen 10, the second mirror 20, and the optical engine 40. The optical engine 40 projects an image and illumination enlarged by a predetermined magnification onto the screen 10 as described above.

Hereinafter, the operation of the optical engine of a projection television structured above will be described with reference to FIGS. 2 through 6.

When the optical engine 40 is powered, a predetermined image is produced in the image producer 60, and a lamp of the light source 81 is turned on thereby emitting illumination. The illumination emitted from the light source 81 enters the mirror device 70 through the lens system 86, the first mirror 87, and the lens 88. The illumination incident on the mirror device 70 is reflected by the mirror 77 at a predetermined angle and forwarded to the prism 54. The illumination incident on the prism 54 is reflected by the image producer 60 and enters the projecting system 52 together with an image through the prism 54. The image and illumination incident on the projecting system 52 are enlarged by a predetermined magnification, reflected by the second mirror 20 and then projected on the screen 10. Thus, users can enjoy enlarged image projected on the screen 10.

Figure 1:
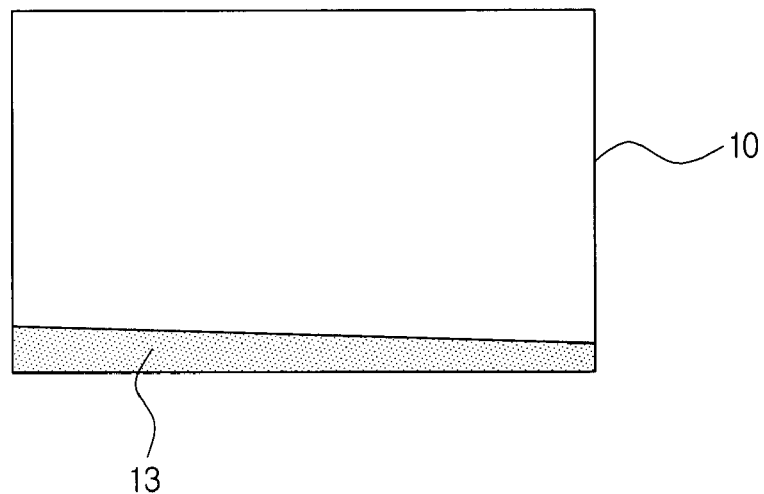
FIG. 1 is a drawing showing a projection television screen when an image does not correspond with illumination.

However, when the illumination incident on the image producer 60 from the light source 81 does not correspond with the image producer 60, a shadow 13 may appear on the screen 10 (FIG. 1). When the shadow 13 appears, it is necessary to adjust the mirror device 70 for removing the shadow 13 from the screen 10.

In order to remove the shadow 13 on the screen by adjusting the mirror device 70, the three screws 79 for fastening the mirror unit 75 to the case 71 are turned to a certain extent. Since the compression spring 73 is disposed between the mirror holder 78 of the mirror unit 75 and the screw portion 72 of the case 71, the angle of the mirror 77 with respect to the incident illumination varies according to the extent one of the screws 79 is turned. When the angle of the mirror 77 varies, the path of the illumination reflected from the mirror 77 and incident on the prism 54 varies. That is, to the extent that the screw 79 is turned, the height of the compression spring 73 changes, and accordingly the interval between the mirror 77 and the screw portion 72 varies. If the interval between the mirror 77 and the screw portion 72 varies, the illumination projected on the screen 10 moves left and right or up and down.

Therefore, the shadow may be removed by moving the illumination left and right or up and down by appropriately adjusting the three screws 79 of the mirror device 70 according to the position of the shadow 13. That is, the path of the illumination from the light source 81 and the image producer 60 are aligned to correspond by adjusting the three screws 79 of the mirror device 70.

As described above, the shadow can be removed from the screen 10 simply by turning the screw 79 of the mirror device 70, and therefore in case the mirror 77 is deviated as a projection television is manufactured in a factory or due to a shock caused during use, the mirror 77 can be simply adjusted.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical engine of a projection television for enlarging an image produced in an image producer and projecting the enlarged image on a screen, the optical engine comprising:
   a light generator;
   a mirror device for reflecting illumination emitted from the light generator thereby changing a path of the illumination, the mirror device in which a reflection angle of the illumination can be adjusted;
   a projection apparatus for enlarging and projecting the image produced in the image producer on the screen by reflecting the image to an incident illumination from the mirror device,
   wherein the path of the illumination is aligned to correspond for the whole image produced in the image producer to be projected on the screen by adjusting the mirror device; and wherein the mirror device further comprises:
   a case having a shape of a box fastened to the projection apparatus;
   screw portions formed at three corners of a quadrangle defining an upper portion of the case;
   a mirror unit with a mirror fastened therein for reflecting the illumination emitted from the light generator, the mirror unit comprising holes corresponding to the screw portions;
   three compression springs disposed between the screw portions of the case and the holes of the mirroring unit respectively; and
   three screws assembled in the screw portions of the case through the holes and the compression springs of the mirroring unit,
   wherein a reflection angle of the mirror is adjusted by turning the three screws.

2. The optical engine of a projection television according to claim 1, wherein the mirror unit comprises:
   a mirror;
   a mirror holder receiving the mirror and having the holes at three corners corresponding to the screw portions of the case; and
   a mirror fastening bracket for fastening the mirror to the mirror holder.

3. The optical engine of a projection television according to claim 1, wherein the image producer is a Digital Micromirror Device (DMD).

4. An optical engine of a projection television for enlarging an image and projecting the enlarged image on a screen, the optical engine comprising:
   a Digital Micromirror Device (DMD) for projecting an image;
   a light source disposed at one side of the DMD;
   a lens system for condensing illumination emitted from the light source;
   a first mirror for changing a path of illumination from the lens system;
   a lens for condensing illumination from the first mirror;
   a mirror device with a reflection angle adjusted by turning a screw, for reflecting illumination passed the lens onto the DMD;
   a prism disposed on a front surface of the DMD for causing illumination from the mirror device to be reflected onto the DMD; and
   a projection system for enlarging an image and illumination from the prism and projecting the enlarged image and illumination onto the screen;
   wherein the mirror device comprises:
   a case having a shape of a box fastened to the projection apparatus;
   screw portions formed at three corners of a quadrangle defining an upper portion of the case;
   a mirror unit with a mirror fastened therein for reflecting the illumination emitted from the light generator, the mirror unit comprising holes corresponding to the screw portions;
   three compression springs disposed between the screw portions of the case and the holes of the mirroring unit respectively; and
   three screws assembled in the screw portions of the case through the holes and the compression springs of the mirroring unit, wherein a reflection angle of the mirror is adjusted by turning the three screws.

5. The optical engine of a projection television according to claim 4, wherein the mirror unit comprises:
a mirror;
a mirror holder receiving the mirror and having the holes at three corners corresponding to the screw portions of the case; and
a mirror fastening bracket for fastening the mirror to the mirror holder.

6. The optical engine of a projection television according to claim 4, further comprising a color filter disposed between the light source and the lens system.

7. A projection television comprising:
a screen;
a body for securing the screen in place;
a Digital Micromirror Device (DMD) disposed at a lower part of the body for producing a predetermined image;
a light source disposed at one side of the DMD;
a lens system for condensing illumination emitted from the light source;
a first mirror for changing a path of illumination from the lens system;
a lens for condensing illumination from the first mirror;
a mirror device with a reflection angle adjusted by turning a screw, for reflecting illumination passed the lens onto the DMD;
a prism disposed on a front surface of the DMD for causing illumination from the mirror device to be reflected onto the DMD;
a projection system for enlarging an image and illumination from the prism and projecting the enlarged image and illumination onto the screen; and
a second mirror disposed on the body behind the screen for reflecting an image and illumination from the projection system;
wherein the mirror device comprises;
a case having a shape of a box fastened to the projection apparatus;
screw portions formed at three corners of a quadrangle defining an upper portion of the case;
a mirror unit with a mirror fastened therein for reflecting the illumination emitted from the light generator, the mirror unit comprising holes corresponding to the screw portions;
three compression springs disposed between the screw portions of the case and the holes of the mirroring unit respectively; and
three screws assembled in the screw portions of the case through the holes and the compression springs of the mirroring unit,
wherein a reflection angle of the mirror is adjusted by turning the three screws.

* * * * *